United States Patent
Suzuki et al.

(10) Patent No.: US 6,177,751 B1
(45) Date of Patent: Jan. 23, 2001

(54) ROTARY ELECTRIC MACHINE AND BOBBIN THEREOF

(75) Inventors: Yuzuru Suzuki; Sakae Fujitani, both of Shizuoka-ken; Kunitake Matsushita, Shizuoka; Takayuki Yamawaki, Shizuoka; Hiroshi Sano, Shizuoka; Kazuo Muramatsu, Shizuoka; Taichi Nishio, Shizuoka, all of (JP)

(73) Assignee: Minebea Co., Ltd., Nagano-Ken (JP)

( * ) Notice: Under 35 U.S.C. 154(b), the term of this patent shall be extended for 0 days.

(21) Appl. No.: 09/377,787

(22) Filed: Aug. 20, 1999

(30) Foreign Application Priority Data

Aug. 21, 1998 (JP) .................................................. 10-235507

(51) Int. Cl.⁷ ............................ H02K 1/24; H02K 15/00; H02K 1/00; H02K 1/18; H02K 1/12
(52) U.S. Cl. ............................ 310/269; 310/42; 310/194; 310/218; 310/259
(58) Field of Search .................................... 310/269, 264, 310/45, 214, 42, 194, 218, 259

(56) References Cited

U.S. PATENT DOCUMENTS

| | | | |
|---|---|---|---|
| 2,655,613 | * 10/1953 | Weiseman | 310/264 |
| 2,691,113 | * 10/1954 | Ordas | 310/214 |
| 2,870,357 | * 1/1959 | Vandenberg et al. | 310/269 |
| 4,795,933 | * 1/1989 | Sakai | 310/269 |

FOREIGN PATENT DOCUMENTS

| | | | |
|---|---|---|---|
| 359070160A | * | 4/1984 | (JP) . |
| 403155347A | * | 7/1991 | (JP) . |

* cited by examiner

Primary Examiner—Nestor Ramirez
Assistant Examiner—Guillermo Perez
(74) Attorney, Agent, or Firm—Faye, Sharpe, Fagan, Minnich & McKee, LLP (57) ABSTRACT

The object of the present invention is to provide a rotary electric machine that provides bobbins with good assembling efficiency and allows no dislocation of the stator. A motor 2 comprises a case 4, a stator 6 secured inside the case 4, a rotor 10 formed into one piece with a rotating shaft 8. The stator 6 comprises stator yokes 32 and the stator yokes are secured in a radial manner in the case 4. Furthermore, resin 58 is filled in between the stator 6 and the case 4 with a space for the rotor being left. The stator yokes 32 comprise a salient pole 34, a bobbin 36 for holding the salient pole 34, and a magnetic wire 38 wound around the bobbin 36. A collar 39b of the bobbin 36 is formed so as to contact each other with notches 3 formed on two, upper and lower edge portions. Accordingly, combining two bobbins 36, 36 allows through-holes 5 penetrating the collar 39b thereof. This allows the stator to be firmly assembled, provides good assembling workability, and allows no dislocation owing to resin flowing when the resin is injected.

14 Claims, 7 Drawing Sheets

ROTARY ELECTRIC MACHINE AND BOBBIN THEREOF

BACKGROUND OF THE INVENTION

1. Field of the Invention

The present invention relates to a miniature cylindrical radial-gap type rotary electric machine having improved mounting accuracy of stator yokes and handling such as assembly thereof and, more particularly, to a bobbin that allows positive positioning between the stator yokes and a rotary electric machine adopting the bobbin.

2. Description of the Prior Arts

Generally, an inner rotor type brushless DC motor has stator yokes arranged on the inside of a case of the motor and a rotor rotatably arranged at the center portion of the stator yokes wherein the stator yokes are excited to rotatably drive the rotor. A stator yoke comprises a salient pole composed of a plurality of laminated thin plates which is fitted into a bobbin and magnet wires wound around the bobbin. The stator yokes, thus fabricated are predetermined positions inside the case of the motor.

The inventor of the present application proposed in Japanese Patent Application No. 178687/1997 a rotary electric machine wherein resin is injected in between a case of the motor and a stator portion to form them into one piece. This proposal brings such advantages that filling of the resin allows the stator to be secured to the case with the result that assembling accuracy is improved and durability is increased.

However, in the above proposed motor a plurality of stator yokes must be secured to the inside of the case with accuracy, thus resulting in much labor and time for the assembly. For example, when a plurality of stator yokes are mounted on the inner surface of the case, if the center of the assembly is dislocated from the center of revolution of the rotor, or there is a variation of a distance between the stator yokes thus mounted, then torque ripple or cogging torque shall be increased with the result that the performance of the motor will be lowered.

Furthermore, in the rotary electric machine above-mentioned wherein resin is injected in the case of the motor, the stator yokes must be positively held at predetermined positions until the resin completely solidifys. In this case, there are problems in that weak holding of the stator yokes causes displacement thereof or dislocation of the center thereof thereby reducing the efficiency of the motor.

Furthermore, if the stator yokes are arranged so closely with each other at the edge portions thereof, resin flow will be blocked thus preventing resin from being filled in the whole stator yokes from the front to the rear surfaces thereof.

SUMMARY OF THE INVENTION

It is an object of the present invention to solve the foregoing problems and provide a rotary electric machine wherein stator yokes are positively positioned and secured so that smootly flow of resin is improved when the resin is filled in the armature portion including the case, and good durability is provided.

According to the present invention, a rotary electric machine is constituted as mentioned below in order to solve the foregoing problems.

That is, according to the present invention, in a cylindrical radial-gap rotary electric machine wherein a salient pole is inserted into the center of a bobbin, stator yokes in which magnetic wires are wound around said bobbins are radially arranged, and a rotor having a permanent magnet is rotatably provided against the salient pole of the stator yoke, both ends of the stator yoke bobbin are formed to contact with each other, whereby stator yokes can be arranged with accuracy by allowing an edge to contact with another edge and can be positively secured at predetermined positions as well.

Furthermore, notches are formed at the bobbin, for example, at contact portions on the edge of the bobbin, and through-holes are formed which penetrate the stator yoke. Accordingly, injecting resin in between the stator yokes and the case causes the resin to flow through the through-holes out to the front and rear surfaces of the bobbin, whereby the stator yokes are secured into one piece with the resin, and thus assembly work can be simplified and the mounting accuracy of the motor can be improved.

The through-holes may be not only notches or the like provided on the edge of the bobbin, but also holes that penetrate the bobbin itself.

Furthermore, the stator yoke may be provided, on the edge thereof, with a projection and depression so that other bobbins are mated with each other. This allows the stator yoke to be more secure when stator yokes are combined, and allows the securing force to be increased as well. The mating portion may have at least, but is not necessarily limited to, a projection and a depression that allows for no displacement between bobbins; the mating portion may be of a slidable type for assembly, may be provided with a pin and a hole for insertion, or may be mated with another one by bonding or adhesion.

Furthermore, such a rotary electric machine is possible in that the stator yoke may be provided on, but is not limited to, the outer circumference; the stator yoke may be arranged inside and a rotor outside.

DETAILED DESCRIPTION OF THE PREFERRED EMBODIMENTS

The present invention will now be explained below by reference to the drawings by taking a motor as an example of a rotary electric machine according to the invention.

Figure 1:
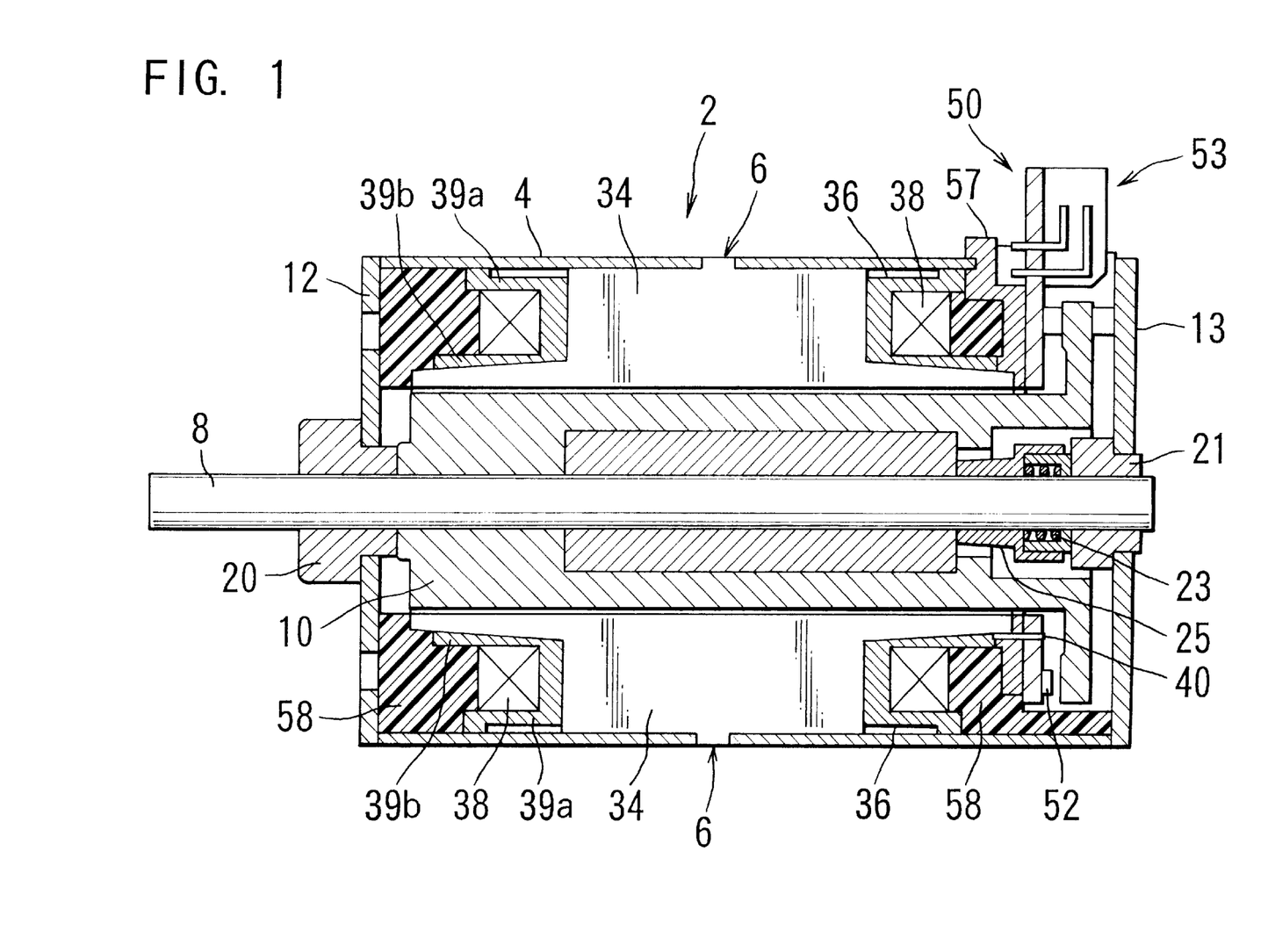
FIG. 1 is a longitudinal sectional view showing an embodiment of a motor as an example of a rotary electric machine according to the present invention.
Figure 2:
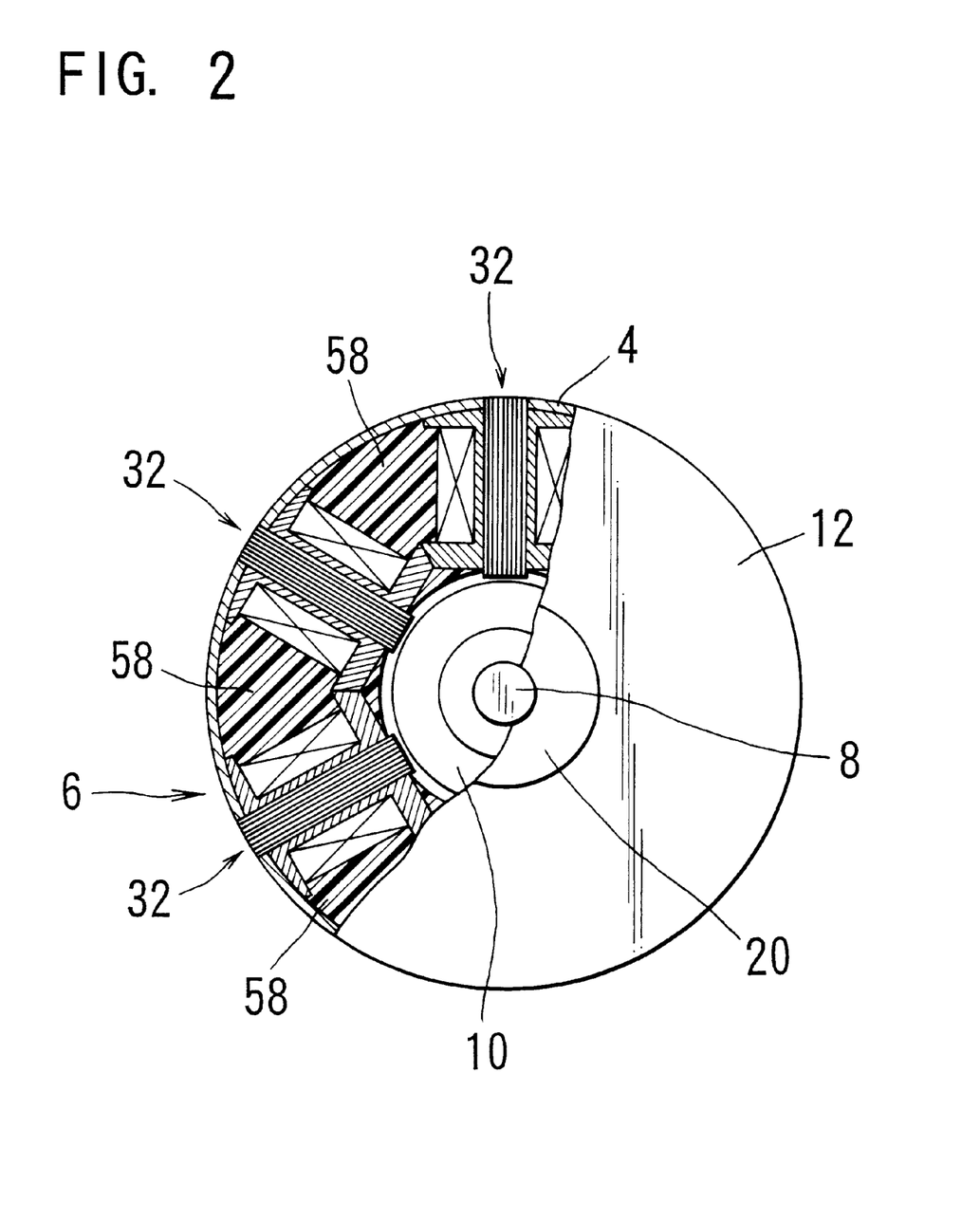
FIG. 2 is a cross-sectional view of the motor shown in FIG. 1.

FIG. 1 shows a longitudinal section of a motor 2, and FIG. 2 shows a cross section of the motor 2. The motor 2 is a 3-phase inner rotor type brushless DC motor having six salient poles and eight rotor field poles. The motor 2 comprises a case 4, a stator 6 secured inside the case 4, and a rotor 10 built into one piece with a rotary shaft 8.

The case 4 is made of metal, has an approximately cylindrical shape, and is provided with flanges 12 and 13 on both ends thereof. The flanges 12 and 13 are provided with bearings 20 and 21. These bearings 20 and 21 rotatably support the rotary shaft 8.

The rotor 10 comprises the rotary shaft 8, a rotor magnet with eight rotor field poles, and a sleeve, and is rotatably supported by the bearings 20 and 21 as mentioned above. Furthermore, the rotor 10 is provided with a spring holder 25 and a spring 23, whereby the rotor 10 is adequately positioned in the axial direction thereof, and the pre-load onto the bearing 20 is adequately set.

Figure 3:
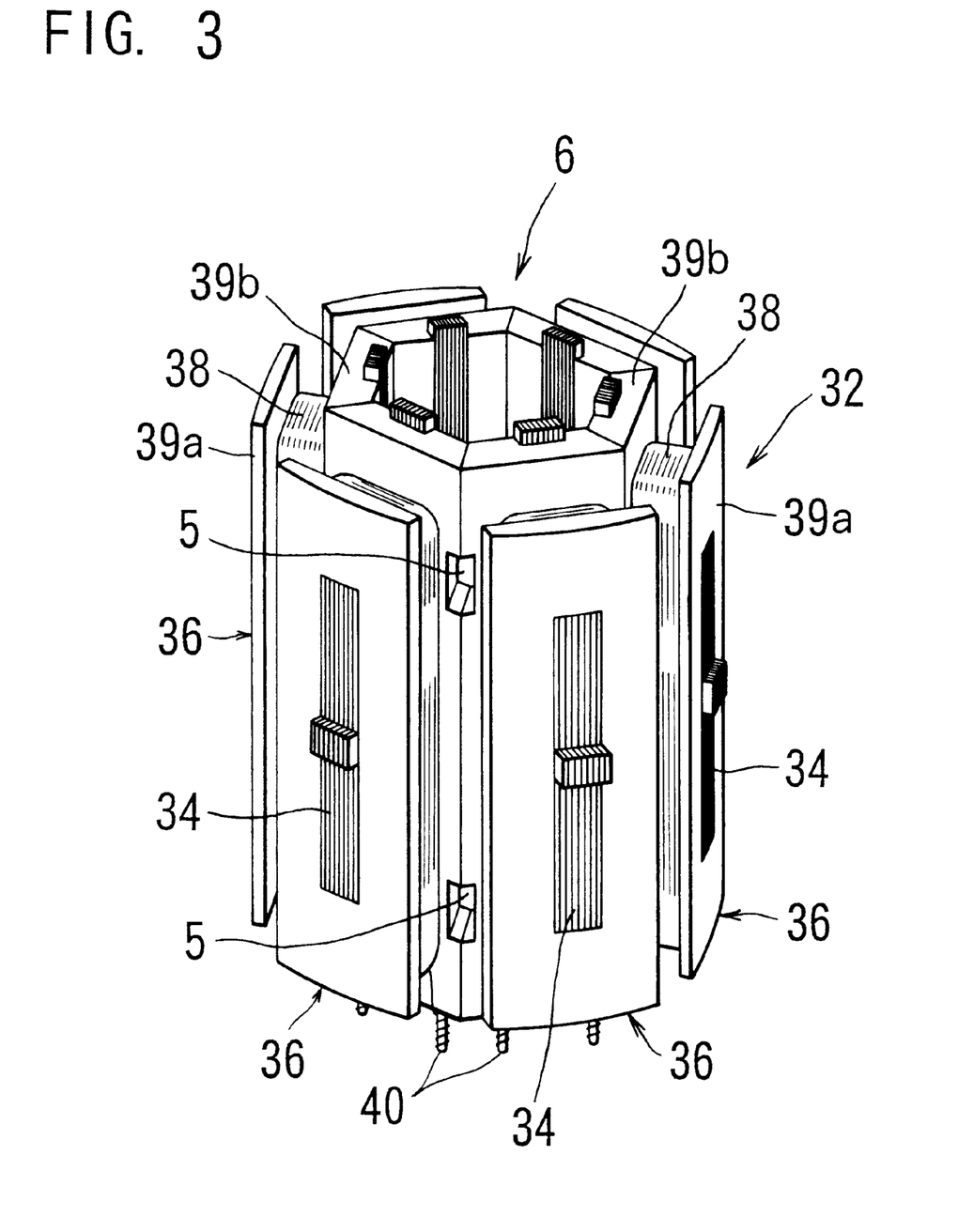
FIG. 3 is a perspective view showing an embodiment of a stator of the motor shown in FIG. 1.
Figure 4:
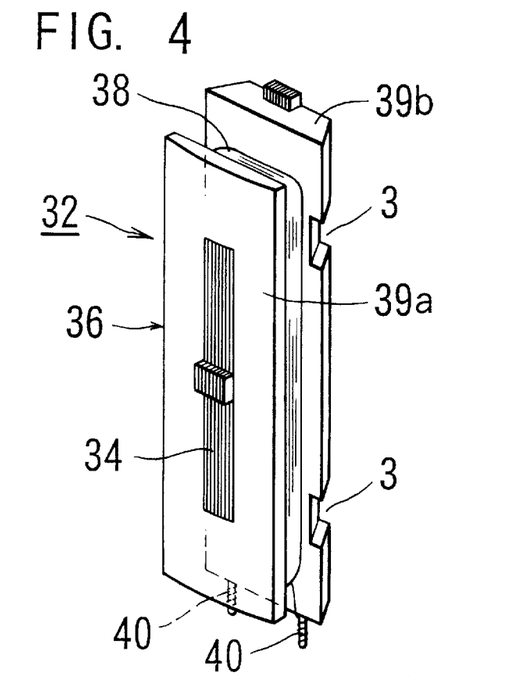
FIG. 4 is a perspective view showing an embodiment of a stator yoke of the stator shown in FIG. 3.

As shown in FIGS. 2 and 3, the stator 6 comprises six stator yokes 32 and is secured radially inside the case 4. A stator yoke 32 is shown in FIG. 4, wherein each stator yoke 32 comprises a salient pole 34, a bobbin 36 for supporting the salient pole 34, and a magnet wire 38 wound around the bobbin 36.

Figure 5:
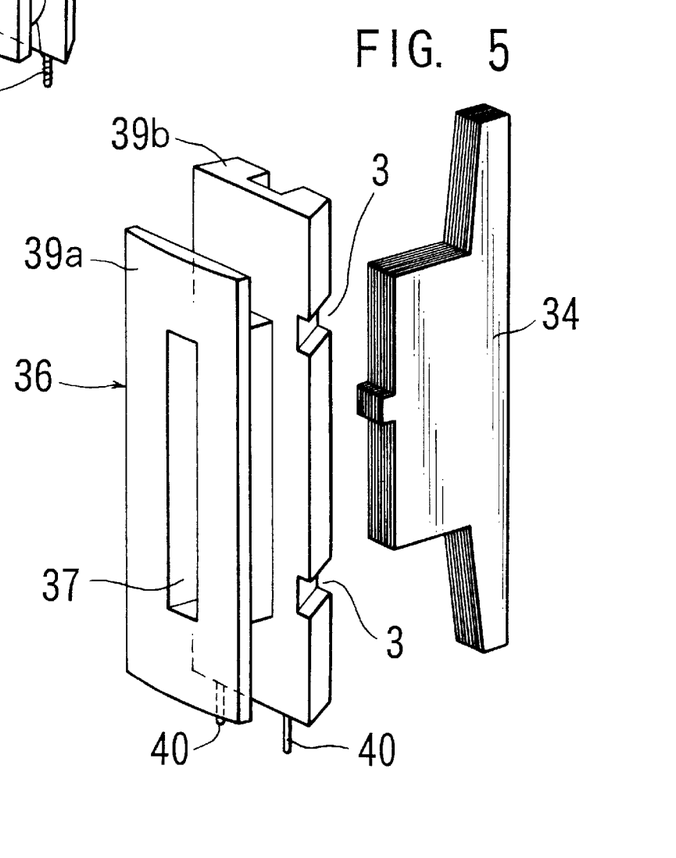
FIG. 5 is a perspective view showing a salient pole and a bobbin of the stator shown in FIG. 3.

As shown in FIG. 5, the salient pole 34 comprises nine pieces of electromagnetic steel plates, each having a thickness of 0.35 mm, punched into a shape of a letter T and laminated in parallel to the shaft. The narrowly formed portion of the salient pole 34 of T shape is inserted into a rectangular hole 37 of the bobbin 36, while the elongated portion is so arranged as to project slightly from the bobbin 36 toward the rotary shaft 8. The salient pole 34 may be laminated in the axial direction so as to be inserted into the rectangular hole 37.

The bobbin 36 which is made of resin, has collars 39a and 39b and a rectangular hole 37, and is provided with a magnet wire 38 wound around the outer circumference of the rectangular hole 37. The bobbin 36 is provided on the lower end thereof with terminals 40 in which the wound magnetic wire 38 is tied up at the end thereof. The magnet wire 38 is tied up at the terminals 40 and then soldered.

Furthermore, the collar 39b of the bobbin 36 is provided with notches 3 along the direction of insertion of the salient pole 34. As shown in FIG. 4, two notches 3 are provided on the upper and lower portions on each edge of the bobbin 36, respectively in FIG. 3. Combination of two bobbins 36 shown in FIG. 3 provides a through-hole 5 of the collar 39b.

Thus, when six stator yokes 32 are arranged as shown in FIG. 3, the salient poles 34 of the coil will face the rotor 10 via a small air gap, if the rotor 10 is inserted, and through-holes 5 will be provided at two portions, the upper and lower portions, on each assembled portion. The stator thus fabricated is arranged on the inner face of the case 4 of the motor 2 and secured there to with resin 58.

Now, injection of the resin 58 will be explained below.

Mold resin is injected inside the case 4 of the motor 2 after the stator 6 has been arranged at the predetermined position. As shown in FIG. 2, the resin 58 is filled in between the stator 6 and the case 4, leaving a space at the center for inserting the rotor 10. The resin 58 is also filled in between the stator yokes 32 and towards the side of the rotor 10 through the through-holes 5.

As shown in FIG. 1, the terminal 40 in which the magnet wire 38 is tied up is connected to a printed circuit board 50 on which electric circuits and electronic parts are mounted. The printed circuit board 50 is arranged in an electrically insulated condition on an end of the case 4 approximately in parallel to the flange 13. The printed circuit board 50 includes hall sensors 52 (three in this arrangement) for detecting rotor field poles of the rotor 10 as well as electric circuits, and is connected to a connector 53 for external connection use. With this arrangement information on the position of the rotor 10 in provided via the connector 53 and the rotor 10 in driven by exciting each phase in accordance with such position information from the hall sensors 52. A pin holder 57 made of resin is provided for protection of the connector 53.

Accordingly, in the motor 2, the edge portions of the bobbins 36 of the stator yokes 32, provided with the notches 3, engage with each other to form through-holes 5 penetrating from the front surface to the rear surface by combination of the bobbins. Such arrangement provides accurate coupling of the stator yokes 32. Furthermore, the resin 58 injected after the stator yokes 32 have been accommodated in the case 4 will be filled in toward the side of the rotor 10 though the through-holes 5. This allows complete filling of the resin 58 even at a low injection pressure, and thus allows shortening time of filling of the resin. Additionally secure fixing of the stator yokes 32 can be attained.

Through-holes 5 may be provided not on the edges of the bobbin 36, but may be formed through the collar 39b itself.

Another embodiment of a rotary electric machine is shown below.

Figure 6:
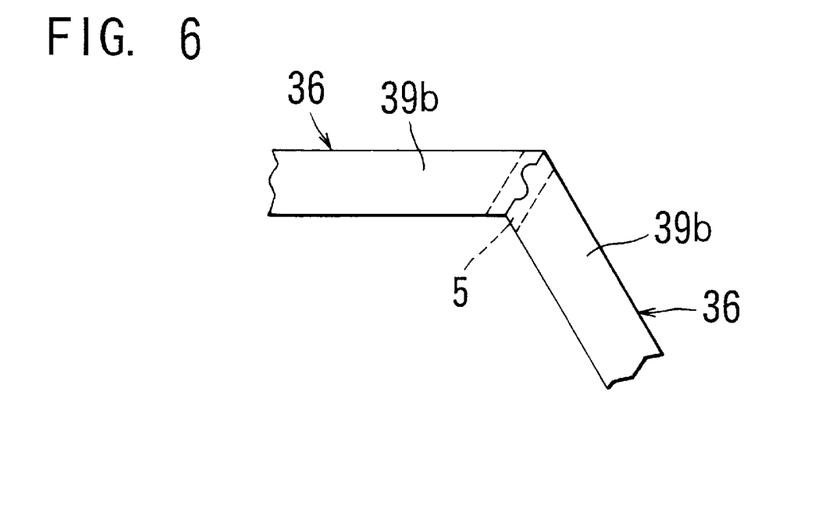
FIG. 6 is a view showing an embodiment of a joint portion of the stator yokes.
Figure 7:
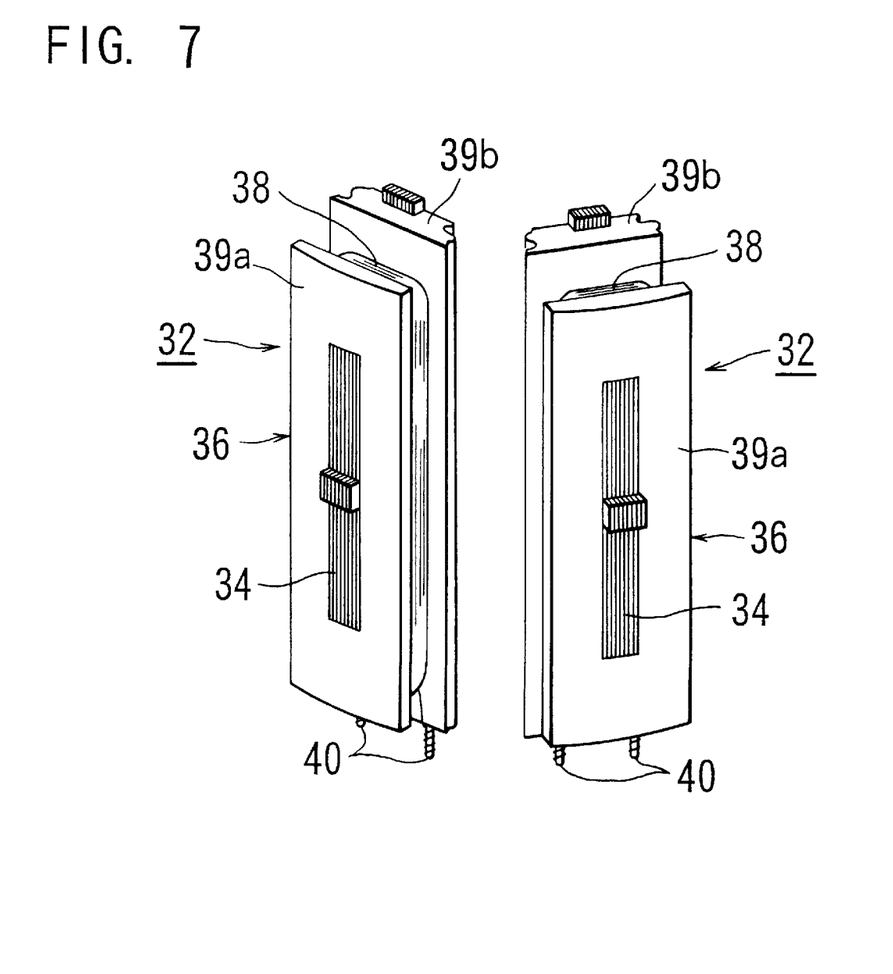
FIG. 7 is a view showing the stator yokes having the joint portion shown in FIG. 6.

In the embodiment shown in FIGS. 6 and 7, the bobbin 36 has a projection and a depression on both edge portions of the collar 39 thereof along a longitudinal direction thereof in a mirror image relationship. As shown in FIG. 6, when two bobbins 36 are brought into engagement with each other, the projection and depression of one bobbin 36 engages those of the other bobbin 36 to secured with each other.

Accordingly, bobbins 36 can be easily handled before the stator 6 is accommodated in the case 4 and can be secured when accommodated in the case 4, and, moreover, will never cause dislocation to occur when the resin 58 is injected. Furthermore, as the through-holes 5 are formed between the stator yokes 32 connected, if the resin 58 is injected after the stator 6 has been accommodated in the case 4, then the resin 58 will penetrate through the through-holes 5 to one side and the other side of the bobbins 36, whereby the stator 6 can be secured to the case 4.

Figure 8:
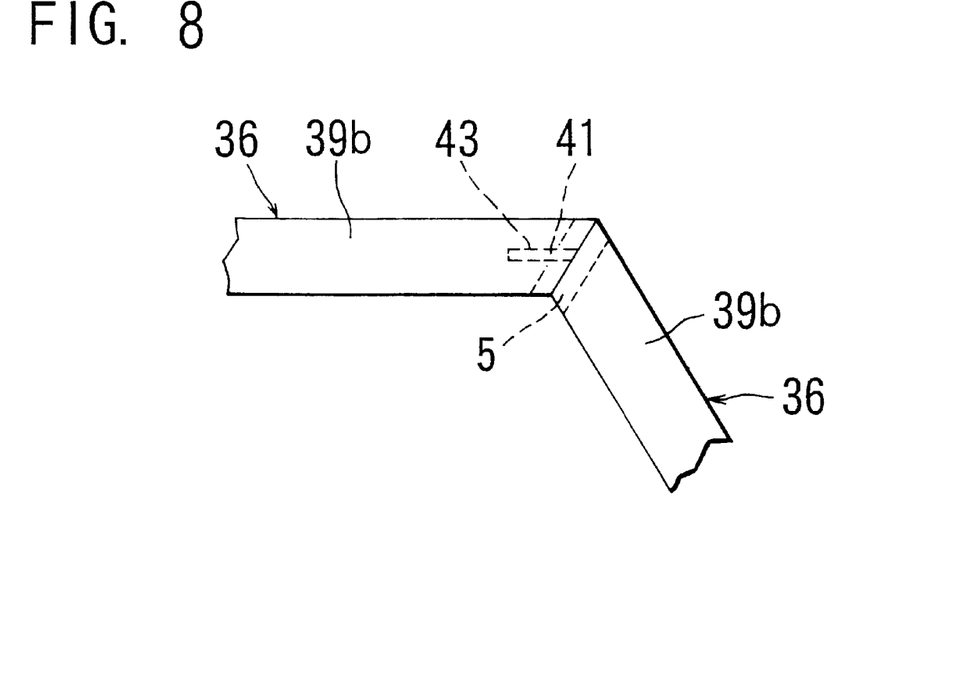
FIG. 8 is a view showing another embodiment of a joint portion of the stator yokes.
Figure 9:
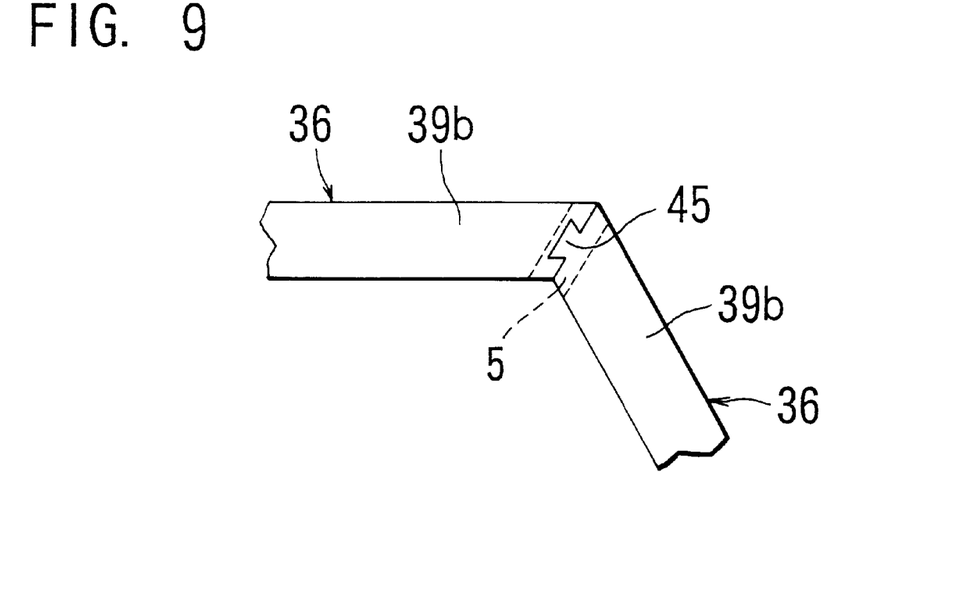
FIG. 9 a view showing further embodiment of a joint portion of the stator yokes.

As shown in FIG. 8, the collar 39b of a first bobbin 36 may be provided with a pin 41, and the collar 39b of another bobbin 36 to be coupled to the first bobbin may be provided with a hole 43 which can fit the pin 41, so that these two bobbins are coupled. Furthermore, as shown in FIG. 9, a slot 45 may be adopted for coupling.

Figure 10:
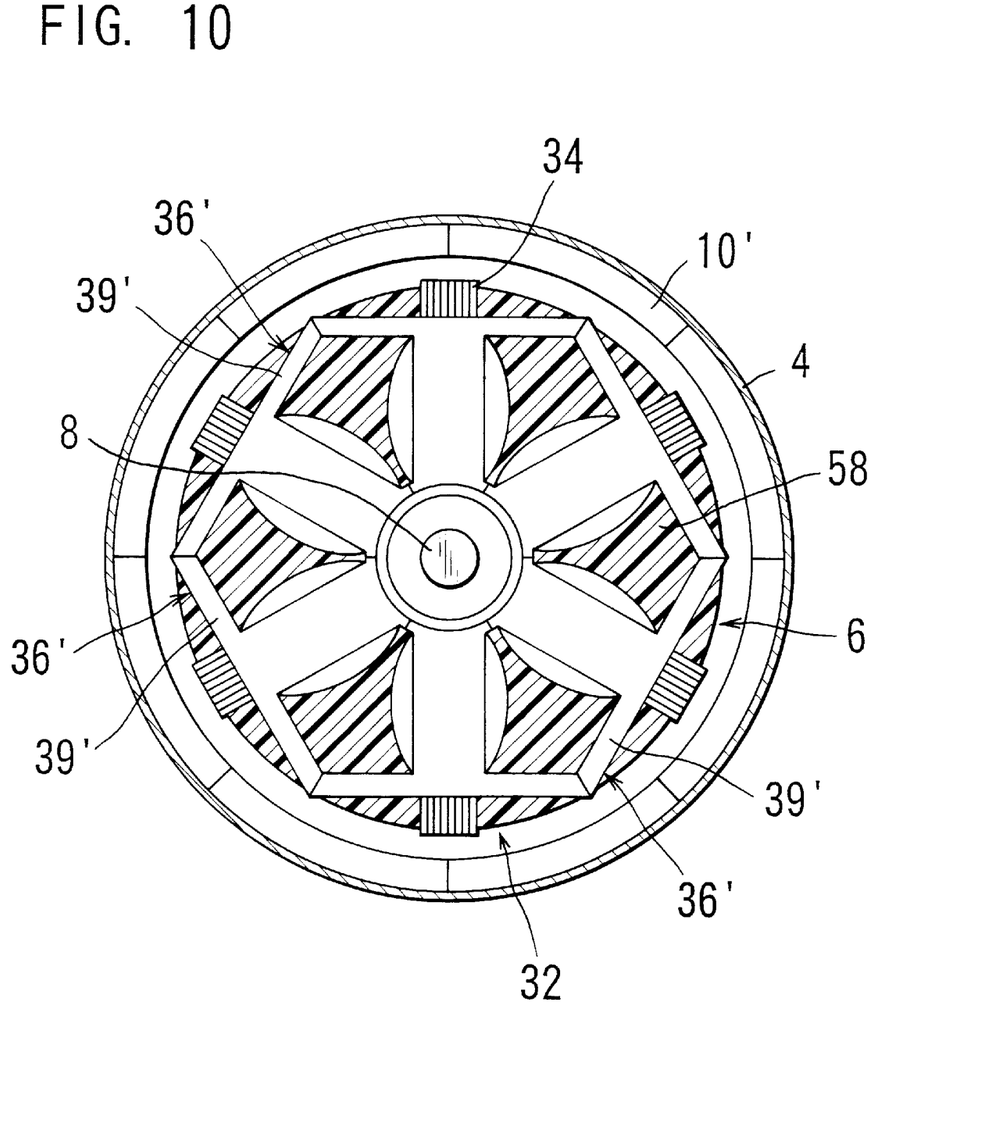
FIG. 10 is a view showing another embodiment of a motor as an example of a rotary electric machine according to the present invention.

A third embodiment will now be explained by reference to FIG. 10. FIG. 10 shows an outer rotor type rotary electric machine having the rotor 10 arranged on the outer circumference. In this embodiment, the contact portions of a stator 6 arranged at the center are formed so as to secure surface contact with each other, thereby providing positive securing of the contact portions of the stator 6. In addition, as mentioned above, the collar 39' of the bobbin 36' may be provided with through-holes for allowing resin to pass through or a shape for engaging each other.

In the foregoing embodiments explanation is given to a motor as an example, however, the stator structure of the rotary electric machine according to the present invention and the rotary electric machine are not limited to only a motor. In addition, the salient pole 34 may not be laminated in parallel to the axial direction of the rotary shaft 8 but may be laminated sequentially in the axial direction in the conventional manner.

According to the present invention, the contact portions of the stator yokes are contacted directly with each other so that handling and assembly of the stator will be easy, and secure fixing in the case will be expected.

Furthermore, through-holes are formed at the stator yokes, so that when resin is filled in between the stator and the case, there will be easy flow of resin through the through-holes to one side and the other side of the collar thereby providing secure fixing of the stator by means of the resin.

Still furthermore, the stator yokes is provided on the contact portion with an engagement portion to allow stators to engage each other, whereby a brushless DC motor can be provided allows easy handling in assembly and no dislocation due to the injection of resin, and has a long life and high reliability.

What is claimed is:

1. A cylindrical radial-gap rotary electric machine, comprising:
   a case;
   a plurality of stator yokes radially arranged in the case, each of the stator yokes having a respective salient pole;
   a resin material located between the case and the stator yokes for securing the stator yokes to the case;
   a plurality of bobbins, respective magnetic wires being wound around each of the bobbins, a respective one of the bobbins being arranged around a corresponding one of the salient poles;
   a rotor, rotatably arranged with respect to each of the stator yokes, including a permanent magnet opposing each of the respective salient poles of said stator yokes, substantially entire portions of a plurality of edges of respective ones of the bobbins contacting substantially entire portions of respective edges of adjacent bobbins; and
   through-holes formed in the bobbins, the resin flowing through the through-holes and substantially filling a space between the case and the stator yokes.

2. The rotary electric machine according to claim 1, wherein the resin flows to a side of the rotor.

3. The rotary electric machine according to claim 1, wherein each of the bobbins includes edges shaped for engagingly contacting the edges of the adjacent bobbins.

4. The rotary electric machine according to claim 1, further including:
   through-holes formed along the edges of the bobbins, the resin flowing through the through-holes.

5. The rotary electric machine according to claim 1, wherein the contacting edges of the adjacent bobbins couple each of the stator yokes to an adjacent stator yoke, each of the coupled stator yokes being at a predetermined position with respect to the other stator yokes.

6. The rotary electric machine according to claim 1, wherein the edges of each of the bobbins are shaped in a mirror image with respect to the edges of the other bobbins.

7. The rotary electric machine according to claim 1, wherein the stator yokes surround the rotor.

8. The rotary electric machine according to claim 1, wherein the rotor surrounds the stator yokes.

9. A method for positioning bobbins between respective stator yokes and a machine case, comprising:
   radially arranging the stator yokes in the machine case, each of the stator yokes having a respective salient pole;
   passing a resin material through through-holes formed in the bobbins;
   substantially filling a space between the machine case and the stator yokes with the resin for securing the stator yokes to the machine case;
   winding respective magnetic wires around the bobbins;
   arranging the bobbins around the salient poles; and
   positioning a rotor in a relationship with respect to the stator yokes such that a permanent magnet attached to the rotor opposes each of the salient poles, substantially entire portions of a plurality of edges of each of the bobbins contacting substantially entire portions of respective edges of adjacent bobbins.

10. The method for positioning bobbins between respective stator yokes and a machine case according to claim 9, wherein the filling step includes:
    passing the resin to a side of the rotor.

11. The method for positioning bobbins between respective stator yokes and a machine case according to claim 9, wherein the passing step includes:
    passing the resin through through-holes along edges of the bobbins.

12. The method for positioning bobbins between respective stator yokes and a machine case according to claim 9, wherein the step of arranging the bobbins includes:
    engagingly contacting the edges of the bobbins with the edges of the adjacent bobbins.

13. A cylindrical radial-gap rotary electric machine, comprising:
    a case;
    a plurality of stator yokes radially arranged in respective predetermined positions within the case and secured to the case by a resin material between the case and the stator yokes;
    a plurality of salients poles, each of the salient poles being associated with a respective stator yoke;
    a plurality of bobbins, respective magnetic wires being wound around each of the bobbins, a respective one of the bobbins being arranged around a corresponding one of the salient poles;
    through-holes formed in the bobbins, the resin flowing through the through-holes and substantially filling a void between the case and the stator yokes; and
    a rotor, rotatably arranged with respect to each of the stator yokes, including a permanent magnet opposing each of the respective salient poles of said stator yokes, the predetermined positions of the stator yokes being achieved when substantially entire portions of a plurality of edges of respective ones of the bobbins contact substantially entire portions of respective edges of adjacent bobbins.

14. The cylindrical radial-gap rotary electric machine according to claim 13, wherein the resin flows to a side of the rotor.

\* \* \* \* \*